(12) United States Patent
Davis et al.

(10) Patent No.: US 6,500,576 B1
(45) Date of Patent: Dec. 31, 2002

(54) HYDROGEN RECOMBINATION CATALYST

(75) Inventors: Stuart M. Davis, Norfolk, MA (US); Peter R. Moses, Windham, NH (US); David L. Pappas, Waltham, MA (US)

(73) Assignee: The Gillette Company, Boston, MA (US)

( * ) Notice: Subject to any disclaimer, the term of this patent is extended or adjusted under 35 U.S.C. 154(b) by 44 days.

(21) Appl. No.: 09/605,902

(22) Filed: Jun. 28, 2000

(51) Int. Cl.$^7$ ................................................ H01M 4/00
(52) U.S. Cl. .............................. 429/27; 429/82; 429/53
(58) Field of Search ............................... 429/27, 28, 19, 429/40, 17, 12, 86, 53, 82, 57, 72, 176

(56) References Cited

U.S. PATENT DOCUMENTS

| | | | |
|---|---|---|---|
| 3,893,870 A | 7/1975 | Kozawa | 136/107 |
| 3,896,042 A | 7/1975 | Anderson et al. | 252/184 |
| 3,939,006 A | 2/1976 | Kozawa | 136/6 GC |
| 3,963,826 A | 6/1976 | Anderson et al. | 423/248 |
| 4,224,384 A | 9/1980 | Kozawa et al. | |
| 4,350,610 A | 9/1982 | Jung et al. | |
| 5,432,022 A | 7/1995 | Cheiky | |
| 5,506,067 A | 4/1996 | Tinker | |
| 5,563,004 A | 10/1996 | Buzzelli et al. | |

FOREIGN PATENT DOCUMENTS

| | | | |
|---|---|---|---|
| DE | 26 52 152 | | 9/1977 |
| DE | 40 39 211 A1 | | 6/1992 |
| EP | 0819321 | * | 1/1998 |
| EP | 0 838 872 A2 | | 4/1998 |
| JP | 58197684 | | 11/1983 |
| JP | 07130404 | | 5/1995 |
| WO | WO 91/01175 | | 2/1991 |
| WO | WO 91/17581 | | 11/1991 |

OTHER PUBLICATIONS

Kozawa; "Hydrogen Gas Absorber Made of $MnO_2$ Catalyzed with Palladium or Platinum Salts," *Denki Kagaku*, 46:416–418, 1978 (No Month available).

* cited by examiner

Primary Examiner—Stephen Kalafut
Assistant Examiner—R Alejandro
(74) Attorney, Agent, or Firm—Fish & Richardson P.C.

(57) ABSTRACT

A metal-air battery includes (a) an anode; (b) a cathode including a metal that reduces oxygen; (c) a housing for the anode and cathode having an air access that allows oxygen to contact the cathode; (d) a separator between the anode and the cathode; and (e) a hydrogen recombination catalyst within the housing. The hydrogen recombination catalyst can include a Pd, Pt, Ru metal or a salt thereof, and CuO.

30 Claims, 2 Drawing Sheets

6

HYDROGEN RECOMBINATION CATALYST

TECHNICAL FIELD

The invention generally relates to metal air electrochemical cells.

BACKGROUND

Batteries are commonly used electrical energy sources. A battery includes a housing containing a negative electrode, typically called the anode, and a positive electrode, typically called the cathode. The anode contains an active material that can be oxidized; the cathode contains or consumes an active material that can be reduced. The anode active material is capable of reducing the cathode active material. In order to prevent direct reaction of the anode material and the cathode material, the anode and the cathode are electrically isolated from each other by a sheet-like layer, typically called the separator.

When a battery is used as an electrical energy source in a device, such as a hearing aid or a cellular telephone, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

In a metal air electrochemical cell, oxygen is reduced at the cathode, and a metal, such as zinc, is oxidized at the anode. Oxygen is supplied to the cathode from the atmospheric air external to the cell through air access ports in the battery housing. Metal oxide, such as Zinc oxide or zincate, is formed in the anode. Thus, the overall electrochemical reaction within a zinc-air electrochemical cell results in zinc metal being oxidized to zinc ions and oxygen from the air being reduced to hydroxyl ions. While these chemical reactions are taking place, electrons are transferred from the anode to the cathode thereby providing power to the device. An undesirable process can also occur, where the zinc reacts directly with the electrolyte to produce zinc oxide and hydrogen. This not only depletes zinc and electrolyte, but the hydrogen can accumulate to increase internal pressure, damage the cathode and induce leakage. Mercury and other metals such as lead and cadmium often are added to the anode to reduce the levels of hydrogen gas produced during the electrochemical reaction of the battery.

SUMMARY

In general, the invention relates to a hydrogen recombination catalyst for metal air electrochemical cells. Metal air electrochemical cells containing hydrogen recombination catalysts have reduced hydrogen gassing. At the same time, the hydrogen recombination catalyst can partially replenish the water content of the electrolyte within the metal-air electrochemical cell, and thereby reduce the amount of drying of the electrochemical cell.

In one aspect, the invention features a metal-air battery including (a) an anode; (b) a cathode including a metal that reduces oxygen; (c) a housing for the anode and cathode having an air access that allows oxygen to contact the cathode; (d) a separator between the anode and the cathode; and (e) a hydrogen recombination catalyst within the housing. The hydrogen recombination catalyst can include Pd, Pt, Ru metals or salts thereof, and CuO.

In another aspect, the invention features a method of replenishing the water level in an metal-air battery by positioning a hydrogen recombination catalyst in a metal-air battery. The metal-air battery includes (a) an anode, (b) a cathode that includes a metal that reduces oxygen when the battery is in use, and (c) a separator between the anode and the cathode. The hydrogen recombination catalyst cycles between an oxidative stage to oxidize hydrogen to water and a reductive stage to reduce oxygen to regenerate the oxidative properties of the hydrogen recombination catalyst, e.g., when hydrogen encounters the catalyst in the presence of oxygen, the hydrogen is oxidized to water and the catalyst is reduced (the oxidative stage).

The reductive stage occurs when oxygen in the electrochemical cell interacts with a reduced hydrogen recombination catalyst to oxidize the catalyst and thereby restore the oxidative properties of the hydrogen recombination catalyst, i.e., once re-oxidized by oxygen, the catalyst can, in turn, further oxidize hydrogen to water. As a result of the hydrogen recombination catalysts' ability to periodically cycle through the oxidative and reductive stages, the hydrogen recombination catalyst in a metal air electrochemical cell oxidizes an amount of hydrogen above the theoretical anaerobic hydrogen absorption limit of the catalyst. The theoretical anaerobic hydrogen absorption limit can be determined based on the molar amounts of catalyst material and by assuming that the catalyst undergoes only a single, complete oxidative stage without undergoing a reductive stage. The hydrogen recombination catalyst preferably oxidizes an amount of hydrogen greater than about 2 times the theoretical anaerobic hydrogen absorption limit. At ambient temperature, the hydrogen recombination catalyst preferably oxidizes hydrogen at a rate at least about 0.5 standard cubic centimeter (scc) per gram of hydrogen recombination catalyst per day. Under anaerobic conditions, the hydrogen recombination catalyst preferably can oxidize hydrogen at this rate for at least 130 days. More preferably, the hydrogen recombination catalyst preferably can oxidize hydrogen at this rate for at least 240 days. Under aerobic conditions, the hydrogen recombination catalyst may function indefinitely by combining any hydrogen with oxygen present in the electrochemical cell.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
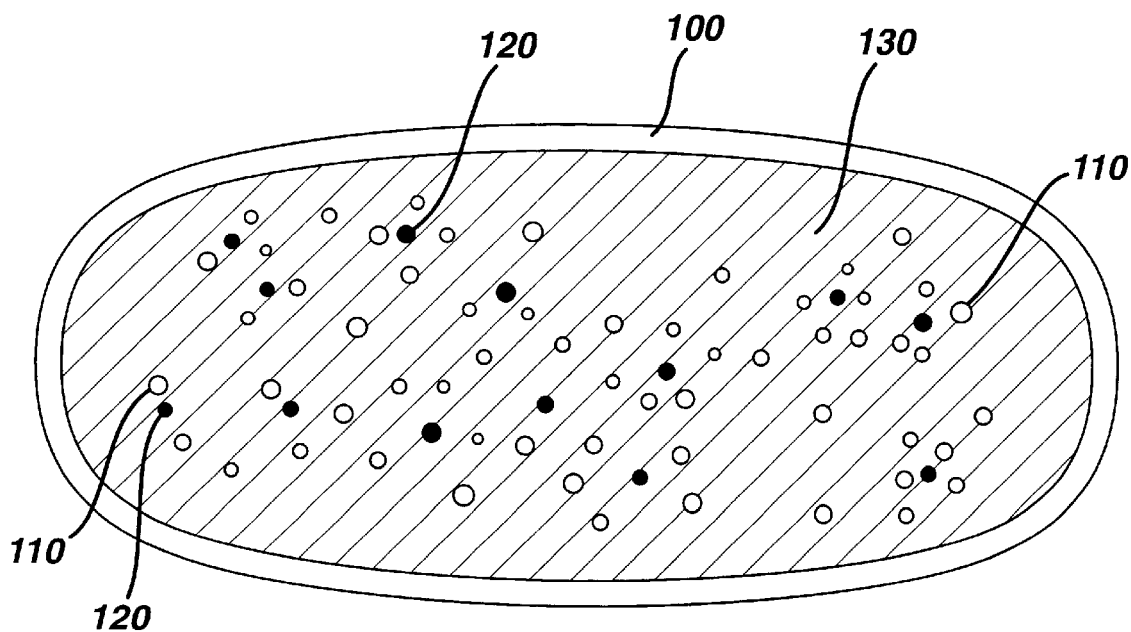
FIG. 1 depicts a cross-sectional view of a hydrogen recombination catalyst.

Referring to FIG. 1, an example of a hydrogen recombination catalyst 6 includes a membrane 100, a hydrogen oxidizing material 110, an activating catalyst 120, and a binder 130. Hydrogen oxidizing material 110 and an activating catalyst 120 are dispersed in binder 130 and encapsulated by membrane 100.

The hydrogen oxidizing material in combination with the activating catalyst absorbs hydrogen gas ($H_2$), produced within a metal-air battery (FIG. 2), preferably, by oxidizing $H_2$ to water ($H_2O$). The hydrogen oxidizing material oxidizes $H_2$ and the activating catalyst lowers the energy of activation of the oxidation process between the hydrogen oxidizing material and $H_2$ to increase the rate at which the oxidation occurs.

At normal temperatures and pressures, $H_2O$ exists as a low vapor pressure liquid, whereas $H_2$ exists as a gas. The occupation volume necessary to contain $H_2$ gas in a battery is reduced when the hydrogen recombination catalyst oxidizes $H_2$ to $H_2O$. For instance, a 1,000 cc occupation volume of $H_2$, when oxidized, is converted into about 0.8 cc occupation volume of liquid $H_2O$. As a result, the hydrogen recombination catalyst can reduce the occupation volume for $H_2$ gas in a battery by, for example, about a factor of 1,000.

When used in a metal-air battery, the hydrogen recombination catalyst cycles through stages of reduction and oxidation. In the oxidative stage, the hydrogen oxidizing material is reduced as $H_2$ is oxidized to $H_2O$. Once fully reduced, the hydrogen oxidizing material can no longer accept electrons and the hydrogen oxidizing material, typically, cannot further oxidize $H_2$ gas without being reoxidized by an oxidant such as oxygen. In the reductive stage, the reduced hydrogen oxidizing material is oxidized by an oxidant. Once reoxidized, the hydrogen oxidizing material can further oxidize $H_2$ to $H_2O$. The hydrogen oxidizing material periodically cycles through the oxidative and reductive stages as long as a reductant, such as $H_2$ gas, and an oxidant, such as $O_2$, are present in the metal-air battery.

As a result of the hydrogen recombination catalysts' ability to periodically cycle through the oxidative and reductive stages, the hydrogen recombination catalyst in a metal air electrochemical cell oxidizes an amount of hydrogen above the theoretical anaerobic hydrogen absorption limit of the hydrogen oxidizing material. The theoretical anaerobic hydrogen absorption limit can be determined based on the molar amounts of the hydrogen oxidizing material and by assuming that the catalyst undergoes only a single, complete oxidative stage without undergoing a reductive stage. The hydrogen recombination catalyst oxidizes preferably about 2 times, more preferably about 6 times, and most preferably greater than about 6 times the theoretical anaerobic hydrogen absorption limit. The hydrogen recombination catalyst preferably oxidizes hydrogen at a rate at least about 0.5 scc, and more preferably 8.0 scc, per gram of hydrogen recombination catalyst per day. The hydrogen recombination catalyst preferably oxidizes hydrogen at a rate of about 0.5 scc per gram of hydrogen recombination catalyst for at least 130 days. More preferably, the hydrogen recombination catalyst oxidizes hydrogen at a rate of about 0.5 scc per gram of hydrogen recombination catalyst for at least 240 days.

Examples of hydrogen oxidizing materials include, but are not limited to, $MnO_2$, $Mn_2O_3$, $MnOOH$, $Mn_3O_4$, $BaO_2$, $CuO$, $Ag_2O$, $AgO$, $HgO$, $KMnO_4$, manganese phosphate, bismuth trioxide, m-dinitrobenzene, quinone, and $AgMnO_4$.

Activating catalysts include Group VIII metals, alloys, oxides or salts. Examples include Pt, Pd, or Ru metals, oxides, salts, or mixtures thereof.

The hydrogen recombination catalyst may include, for example, between about 75 to about 85 weight percent of a hydrogen oxidizing material, between about 0.05 to about 6 weight percent activating catalyst, and between about 10 to about 20 weight percent of a binder and between about 1 to about 5 weight percent of an encapsulation material. Preferably, the hydrogen recombination catalyst includes between about 0.1 to about 2 weight percent activating catalyst. More preferably, the hydrogen recombination catalyst includes between about 0.05 to about 0.2 weight percent of a first activating catalyst, such as Pt or Pd metals, oxides, or salts thereof, and between about 0.2 to about 1.8 weight percent of a second activating catalyst, such as Ru metal, oxide, or a salt thereof.

Suitable binder materials are permeable to hydrogen, oxygen, and water vapor. The binder also increases the active surface area of the hydrogen oxidizing material and the activating catalyst relative to a powder, non-dispersed form of the hydrogen oxidizing material and the activating catalyst. In powder form, the hydrogen oxidizing material and the activating catalyst often form clumps or small masses which inhibit the long-term hydrogen oxidation, i.e., the oxidation rate of $H_2$ after the outer surface of the mass is fully reduced. Examples of binder materials include inorganic cements or organic polymers. Examples of inorganic cements include Portland Cement and Plaster of Paris. Examples of organic polymers include silicone, polyisobutylene, and EP rubber. Silicone polymers such as GE type II silicone rubber are available from GE, located in Waterford, N.Y.

The preferred material which encapsulates the hydrogen recombination catalyst is permeable to $H_2$, $O_2$, and $H_2O$ vapor, but impermeable to other internal components of metal-air batteries, such as KOH present in the battery electrolyte, which may react with or dissolve and thereby inhibit the reactivity of the hydrogen recombination catalyst. The membrane preferably also prohibits contamination of the metal-air battery, such as the anode, by the hydrogen oxidizing material and the activating catalyst. Suitable membrane materials include polyolefins, such as polyethylene, plastics, rubbers, elastomers, fluoroelastomers, and paraffin wax. Other membrane materials include polypropylene, polyethylene/polypropylene copolymers and blends, polybutylene, and blends of waxes with polyolefins. The thickness of the encapsulating membrane is adjusted to provide structural support for the catalyst and to prevent harmful internal components of the metal-air battery from entering the catalyst. The encapsulating membrane is folded over the binder containing the hydrogen oxidizing material and the activating catalyst and the open edges are heat-sealed. Alternatively, the membrane is applied as a coating from a melt, solution, suspension, emulsion, latex or from vapor phase.

Figure 2:
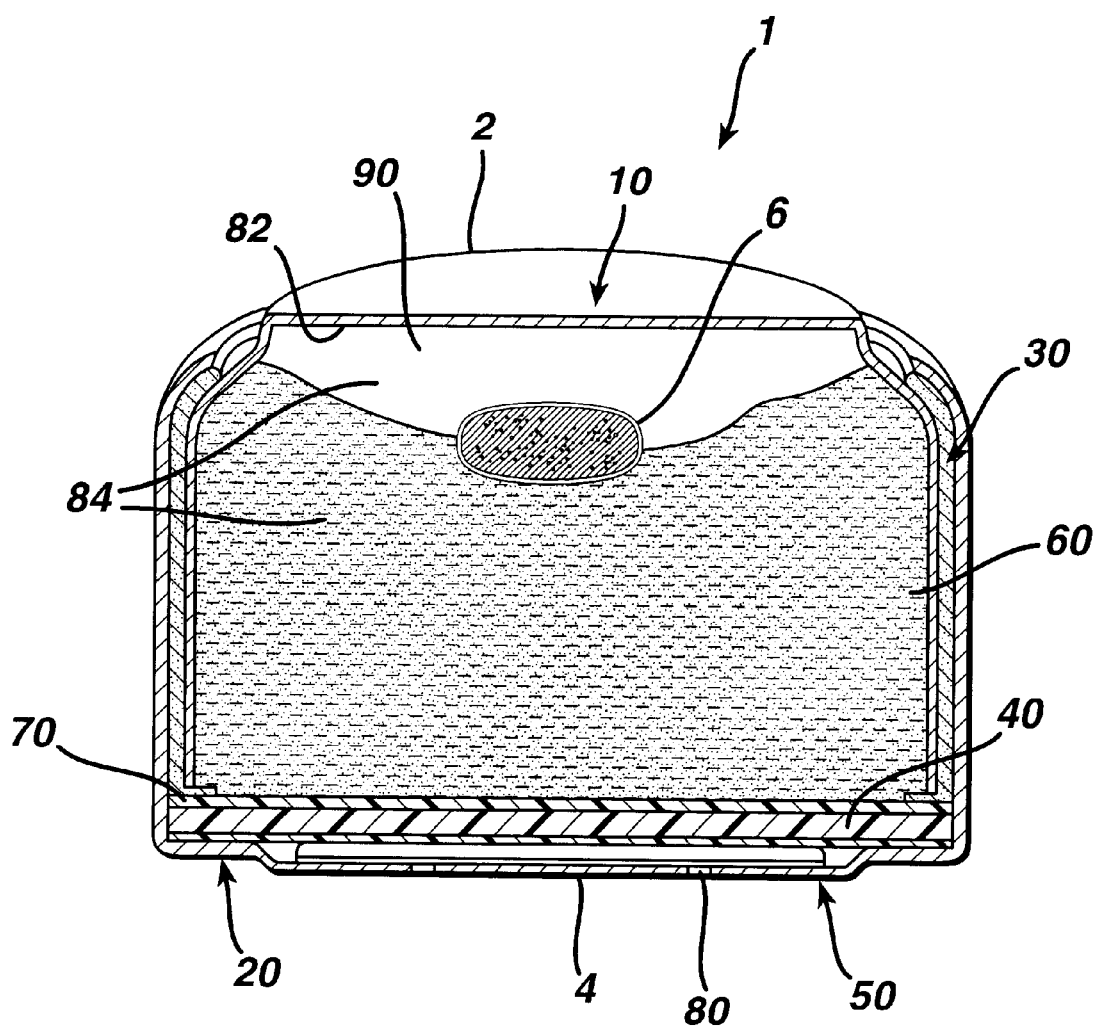
FIG. 2 depicts a cross-sectional view of a metal-air cell.

Referring to FIG. 2, a metal-air battery 1, in the form of a button cell includes an anode 2, a cathode 4, and a hydrogen recombination catalyst 6. Hydrogen recombination catalyst 6 absorbs or converts residual hydrogen gas produced in metal-air battery 1 into water and thereby reduces the level of drying-out of metal-air battery 1. Anode 2 includes anode can 10 and anode gel 60. Cathode 4 includes cathode can 20 and cathode structure 40. Insulator 30 is located between anode can 10 and cathode can 20. Separator 70 is located between cathode structure 40 and anode gel 60, preventing electrical contact between these two components. Air access port 80, located in cathode can 20, allows air to exchange into and out of the cell. Air disperser 50 is located between air access port 80 and cathode structure 40.

Anode can 10 and cathode can 20 are crimped together to form the cell container, which has an internal volume, or cell volume. Together, inner surface 82 of anode can 10 and separator 70 form anode volume 84. Anode volume 84 contains anode gel 60. The remainder of anode volume 84 is void volume 90. Anode gel 60, separator 70, and cathode structure 40, in combination with void volume 90, fill the cell volume. Void volume 90 can vary, for example, between about 7 and 10 percent. The increased void volume can assist in reducing leakage of electrolyte, such as an aqueous solution of KOH, from the cell and reduce pressure build-up due to gas generation in anode compartment. Preferably incorporating a hydrogen recombination catalyst into battery 1, the required void volume needed as a gas expansion chamber can be reduced. As a result, the battery can be filled with more active materials which can increase the output capacity of the battery.

The anode can include a tri-clad or bi-clad material. The bi-clad material can be stainless steel with an inner surface of copper. The tri-clad material is composed of stainless steel having a copper layer on the inner surface of the can and a nickel layer on the outer surface of the can. The anode can include tin on the inner surface. In certain embodiments, the tin is on the inside surface of anode can that makes contact with zinc anode and electrolyte. The tin can be a layer on the inner surface of the can. The tin can be a continuous layer on the inner surface of the can. The tin layer can be a plated layer having a thickness between about 1 and 12 microns, preferably between about 2 and 7 microns, and more preferably about 4 microns. The tin can be pre-plated on the metal strip or post-plated on the anode can. For example, the tin can be deposited by immersion plating (e.g., using a plating solution available from Atotech). The plated layer can have a bright finish or a matte finish. A low porosity layer can exhibit less gassing in a low mercury metal-air electrochemical cell. The coating can include silver or gold compounds.

The cathode can is composed of cold-rolled steel having inner and outer layers of nickel. There is an insulator, such as an insulating gasket, pressure-fit between the anode can and cathode can. The gasket can be thinned to increase the capacity of the cell.

The can configuration can have a straight wall design, in which the anode can side wall is straight, or a foldover design in thinner-walled cans (e.g., about 4 mils thickness). In a foldover design, the clip-off edge of the anode can which is generated during stamping of the can, is placed on the top, outside of can, away from the interior of the cell. The foldover design can reduce potential gas generation by decreasing the possibility of zinc making contact with exposed stainless steel at the anode can clip-off edge. A straight wall design can be used in conjunction with an L- or J-shaped insulator, preferably J-shaped, that can bury the clip-off edge into the insulator foot. When a foldover design is used, the insulator can be L-shaped.

The preferred anode material is zinc. Alternatively, the anode material may be tin, iron, manganese, and lead. The anode gel may contain, for example, a mixture of zinc and electrolyte. The mixture of zinc and electrolyte can include a gelling agent, such as an absorbent polyacrylate, that can help prevent leakage of the electrolyte from the cell and helps suspend the particles of zinc within the anode. Suitable gelling agents are described, for example, in U.S. Pat. Nos. 4,541,871, 4,590,227, or 4,507,438. The cathode structure contains materials (e.g., activated carbon and a manganese compound) that can catalyze the reduction of oxygen which enters the cell as a component of atmospheric air passing through access ports in the bottom of the cathode can. The overall electrochemical reaction within the cell results in zinc metal being oxidized to zinc ions and oxygen from air being reduced to hydroxyl ions. Ultimately, zinc oxide, or zincate, is formed in the anode. While these chemical reactions are taking place, electrons are transferred from the anode to the cathode, providing power to the device. The zinc material can be air or gas blown or spun zinc. Suitable zinc particles are described, for example, pending U.S. Ser. No. 09/156,915, filed Sep. 18, 1998, U.S. Pat. No. 6,284, 410, and pending U.S. Ser. No. 09/115,867, filed Jul. 15, 1998, each of which is incorporated by reference in its entirety. The zinc can be a powder. The particles of the zinc can be spherical or nonspherical. For example, the zinc particles can be acicular in shape (having an aspect ratio of at least two).

The cathode structure has a side facing the anode gel and a side facing the air access ports. The side of the cathode structure facing the anode gel is covered by a separator. The separator can be a porous, electrically insulating polymer, such as polypropylene, that allows the electrolyte to contact the air cathode. The side of the cathode structure facing the air access ports is typically covered by a polytetrafluoroethylene (PTFE) membrane that can help prevent drying of the anode gel and leakage of electrolyte from the cell. Cells can also include an air disperser, or blotter material, between the PTFE membrane and the air access ports. The air disperser is a porous or fibrous material that helps maintain an air diffusion space between the PTFE membrane and the cathode can.

The cathode structure includes a current collector, such as a wire mesh, upon which is deposited a cathode mixture. The wire mesh makes electrical contact with the cathode can. The cathode mixture includes a catalyst for reducing oxygen, such as a manganese compound. The catalyst mixture is composed of a mixture of a binder (e.g., PTFE particles), carbon particles, and manganese compounds. The catalyst mixture can be prepared, for example, by heating manganese nitrate or by reducing potassium permanganate to produce manganese oxides, such as $Mn_2O_3$, $Mn_3O_4$, and $MnO_2$.

During storage, the air access ports are typically covered by a removable sheet, commonly known as the seal tab, that is provided on the bottom of the cathode can to cover the air access ports to restrict the flow of air between the interior and exterior of the button cell. The user peels the seal tab from the cathode can prior to use to allow oxygen from air to enter the interior of the button cell from the external environment.

During operation, residual $H_2$ gas produced at the zinc anode permeates the encapsulating member of the hydrogen recombination catalyst, diffuses through the binder, and is oxidized by the hydrogen oxidizing material and the activating catalyst. Without wishing to be bound by any particular theory, it is believed that the activating catalyst homolytically cleaves the $H_2$ gas into two hydrogen atoms. Each hydrogen atom, in turn, contacts and reduces the hydrogen oxidizing material to form a bond with an oxygen atom and thereby complete the oxidation of $H_2$ into $H_2O$. The hydrogen oxidizing material is reoxidized by ambient oxygen present in the void volume of the battery and the air flow between the exterior and interior of the battery.

$H_2O$ produced by the hydrogen recombination catalyst can be reused by the metal-air battery to partially compensate battery dry-out. Battery dry-out occurs when $H_2O$ vapor from within the battery is drawn into the air flow between the interior and exterior of the battery. As the battery experiences dry-out, $H_2O$ from within the hydrogen recombination catalyst is drawn through the permeable membrane into the battery.

Although shown in FIG. 2 as being located in the anode side of the metal-air battery, the hydrogen recombination catalyst can be located anywhere within the battery. Preferably, the hydrogen recombination catalyst is located in the anode portion of the battery.

In addition, the hydrogen recombination catalyst can be constructed without the binder, i.e., the $H_2$, $O_2$, and $H_2O$ vapor permeable membrane encapsulates a mixture of the hydrogen oxidizing material and the activating catalyst. Alternatively, the hydrogen oxidizing material and the activating catalyst can be alloyed together into a plurality of individual alloyed particles each of which can be encapsulated by the permeable membrane. The coated alloyed particles can be dispersed within the battery, such as in the anode gel or on the surface of the can. Suitable methods for encapsulating individual alloy particles include spray-coating the membrane onto the particles, precipitation/reaction coating, vapor phase deposition with or without subsequent heat treatment.

Moreover, the hydrogen recombination catalyst can be incorporated into any type or size of metal-air batteries such as cylindrical metal-air batteries. Examples of cylindrical metal-air batteries can be found for example in U.S. Pat. No. 6,265,104, which is incorporated by reference in its entirety.

EXAMPLES

Example 1

An agate motor was charged with about 98.9 weight percent CuO, about 0.1 weight percent $PtCl_2$, about 1 weight percent $RuCl_3$, and enough distilled water to create a thick paste. The resulting mixture was ground and dried in an oven at 71° C. The dried mixture was further ground to produce a lump-free powder. About 2.5 g of the resulting powder was blended with about 0.4 g of GE type II silicone rubber and 30 drops of mineral spirits (to reduce viscosity). The resulting blend was equally divided into ten parts. Each part was separately deposited on a 2.7 mil polyethylene film and cured in an oven at 55° C. for about 3.5 hours. A small section of the sheet was folded over the cured material and heat sealed on an impulse sealer to create a polyethylene envelope. Excess polyethylene was trimmed away from the envelope and each of the ten envelopes were weighed. The envelopes were approximately 1 cm×1 cm×0.5 cm.

The rate of hydrogen absorption of the hydrogen recombination catalyst was determined as follows. Each pre-weighed envelope was sealed into a foil bag. The bag was subsequently evacuated and charged with a known amount of hydrogen gas at room temperature. The amount of hydrogen gas absorbed by the catalyst, i.e., the change in the amount of hydrogen in the foil bag, was monitored for 130 days by periodically measuring the buoyancy of the foil bag.

The hydrogen recombination catalysts consumed hydrogen at a rate at least about 0.5 scc per gram of hydrogen recombination catalyst per day for at least 130 days.

Example 2

Another set of hydrogen recombination catalysts used for hydrogen absorption testing electrochemical cells was fabricated as in Example 1 except that the total weight of each envelope plus the catalyst/binder mixture was approximately 35 mg. The catalysts were placed at various locations in the anode cavities of DA635 zinc-air cells as indicated below in table 1.

The DA635 anode cavities were filled with approximately 1.9 g of zinc slurry and assembled into cells in a conventional fashion. Each catalyst envelope was generally square-shaped with an edge length of no more than 6 mm. The total volume of the catalyst was less than 0.05 cc such that it fit into the estimated void space in the electrochemical cell after discharge. In other size cells, the envelope volume should be scaled according to the anode volume of the cell of interest, i.e., smaller anode cavities such as in the DA5 and DA10 hearing aid batteries require smaller catalyst envelopes.

The DA635 test cells were discharged at a constant 220Ω load until they reached the cutoff value of 0.2 V. After discharge, the cells were placed into foil bags and sealed for one week to collect any gas that may escape from the cell. The gas entrapped in the foil bag is referred to as "bag gas" and was determined by measuring the buoyancy of the bag. The change in the amount of gas trapped in the foil bag was determined from the change in buoyancy of the bag at the start and finish of the one-week storage period. After the one week period, the cells were removed from the bag and punctured to release any gas that remained in the cell into another foil bag. The amount of gas release from the punctured cell into the bag is referred to as "in-cell gas." The total amount of evolved gas from the cell is the sum of the bag gas and the in-cell gas. The total amount of evolved gas does not take into account any gas that escaped from the cell during discharge. Accordingly, the efficacy of the hydrogen recombination catalyst was tested relative to a control.

The results of hydrogen absorption efficacy experiments are provided in Table I below, in which the amount of evolved gas is reported as a function of the location of the hydrogen recombination catalyst in the cell. The quantity of in-cell gas is significantly reduced compared to the control when the catalyst envelope was placed against the anode can. Without a hydrogen recombination catalyst, the foil bag starts with a small amount of entrapped air and usually inflates as hydrogen gas is released from the cell. As a result, the amount of bag gas for the control experiment is a positive number. In hydrogen-recombination-catalyst-containing electrochemical cells, some of the gas in the bag is consumed; i.e., the hydrogen recombination catalyst coverts hydrogen (produced in the cell) and oxygen (from the bag) into water, and the bag gas is a negative value. When the envelope is positioned against the anode can, some hydrogen is absorbed directly while some is recombined with oxygen from the electrolyte and the air. As the envelope is moved towards the separator, recombination appears to increase in significance, as the bag gas becomes increasingly negative.

TABLE I

| Sample | Gas Yield (cc) | | |
| --- | --- | --- | --- |
|  | Bag | Cell | Total |
| Control | 0.62 | 0.88 | 1.50 |
| Envelope against anode can | −2.46 | 0.19 | −2.35 |
| Envelope in anode center | −5.16 | 0.75 | −5.08 |
| Envelope against separator | −9.48 | 0.89 | −9.39 |

Other embodiments are within the claims.

What is claimed is:

1. A metal-air battery comprising:
   (a) an anode;
   (b) a cathode including a metal that reduces oxygen;
   (c) a housing for the anode and cathode having an air access that allows oxygen into the housing to contact the cathode;
   (d) a separator between the anode and the cathode; and
   (e) a hydrogen recombination catalyst within the housing, wherein the hydrogen recombination catalyst is encapsulated by a hydrogen and water permeable membrane.

2. The metal-air battery of claim 1, wherein the hydrogen recombination catalyst comprises a compound selected from the group consisting of $MnO_2$, CuO, $Ag_2O$, $BaO_2$, AgO, $KMnO_4$, and $AgMnO_4$.

3. The metal-air battery of claim 1, wherein the hydrogen recombination catalyst comprises CuO.

4. The metal-air battery of claim 2, wherein the hydrogen recombination catalyst further includes a group VIII metal or a salt thereof.

5. The metal-air battery of claim 4, wherein the group VIII metal or salt thereof is selected from the group consisting of Pd, Pt, Ru metal or a salt thereof.

6. The metal-air battery of claim 4, wherein the hydrogen recombination catalyst includes Pt and Ru salts.

7. The metal-air battery of claim 3, wherein the hydrogen recombination catalyst includes $PtCl_2$ and $RuCl_3$.

8. The metal-air battery of claim 4, wherein the hydrogen recombination catalyst includes $PtCl_2$ and $RuCl_3$.

9. The metal-air battery of claim 1, wherein the hydrogen recombination catalyst is dispersed in a binder.

10. The metal-air battery of claim 9, wherein the binder is a silicone.

11. The metal-air battery of claim 1, wherein the hydrogen recombination catalyst is dispersed in a binder, the binder and the hydrogen recombination catalyst being encapsulated in a hydrogen and water permeable membrane.

12. The metal-air battery of claim 1, wherein the hydrogen recombination catalyst is disposed in an anode side of the metal-air battery.

13. The metal-air battery of claim 1, wherein the hydrogen recombination catalyst comprises between about 75 to about 85 weight percent of CuO.

14. The metal-air battery of claim 13, wherein the hydrogen recombination catalyst further comprises between about 0.05 to about 6 weight percent of a group VIII metal or a salt thereof.

15. The metal-air battery of claim 14, wherein the hydrogen recombination catalyst further comprises between about 0.05 to about 0.2 weight percent of a Pt or a salt thereof and between about 0.2 to about 1.8 weight percent of a Ru or a salt thereof.

16. A metal-air battery comprising:
    (a) an anode;
    (b) a cathode including a metal that reduces oxygen;
    (c) a housing for the anode and cathode having an air access that allows oxygen into the housing to contact the cathode;
    (d) a separator between the anode and the cathode; and
    (e) a hydrogen recombination catalyst including a Pd, Pt, Ru metal or a salt thereof, and CuO,
    wherein the hydrogen recombination catalyst is encapsulated by a hydrogen and water permeable membrane.

17. The metal-air battery of claim 16, wherein the hydrogen recombination catalyst includes a binder.

18. A method of replenishing the water level in an metal-air battery, the method comprising:
    positioning a hydrogen recombination catalyst in a metal-air battery, the metal-air battery including (a) an anode, (b) a cathode that includes a metal that reduces oxygen when the battery is in use, and (c) a separator between the anode and the cathode, wherein the hydrogen recombination catalyst periodically cycles through an oxidative stage to oxidate hydrogen to water and a reductive stage to reduce oxygen to regenerate the oxidative properties of the hydrogen recombination catalyst.

19. The method of claim 18, wherein the hydrogen recombination catalyst comprises a Pd, Pt, Ru metal or salts thereof, and CuO.

20. The method of claim 19, wherein the hydrogen recombination catalyst includes between about 0.05 to about 6 weight percent of a Pd, Pt, Ru metal or salt.

21. The method of claim 19, wherein the hydrogen recombination catalyst includes between about 75 to about 85 weight percent of CuO.

22. The method of claim 21, wherein the hydrogen recombination catalyst includes between about 0.05 to about 0.2 weight percent of a Pt or a salt thereof and between about 0.2 to about 1.8 weight percent of a Ru or a salt thereof.

23. The method of claim 18, wherein the hydrogen recombination catalyst includes a binder.

24. A metal-air battery comprising:
    (a) an anode;
    (b) a cathode including a metal that reduces oxygen;
    (c) a housing for the anode and cathode having an air access that allows oxygen into the housing to contact the cathode;
    (d) a separator between the anode and the cathode; and
    (e) a hydrogen recombination catalyst including a Pd, Pt, Ru metal or salt thereof, and CuO, wherein the hydrogen recombination catalyst oxidizes an amount of hydrogen above the theoretical anaerobic hydrogen absorption limits of the Pd, Pt, Ru metal or salt thereof, and CuO,
    wherein the hydrogen recombination catalyst is encapsulated by a hydrogen and water permeable membrane.

25. The metal-air battery of claim 24, wherein the hydrogen recombination catalyst oxidizes greater than about 2 times the theoretical anaerobic hydrogen absorption limit.

26. The metal-air battery of claim 24, wherein the hydrogen recombination catalyst oxidizes hydrogen at a rate at least about 0.5 scc per gram of hydrogen recombination catalyst per day.

27. The metal-air battery of claim 26, wherein the hydrogen recombination catalyst oxidizes hydrogen at the rate for at least 130 days.

28. The metal-air battery of claim 24, wherein the hydrogen recombination catalyst includes between about 0.1 to about 2 weight percent of a Pd, Pt, Ru metal or salt thereof.

29. The metal-air battery of claim 28, wherein the hydrogen recombination catalyst includes between about 75 to about 85 weight percent CuO.

30. The metal-air battery of claim 24, wherein the hydrogen recombination catalyst includes a binder.

* * * * *